United States Patent [19]

Siddall

[11] 4,070,762

[45] Jan. 31, 1978

[54] MEASURING APPARATUS

[75] Inventor: Graham John Siddall, Keyworth, England

[73] Assignee: The Rank Organisation Limited, London, England

[21] Appl. No.: 606,724

[22] Filed: Aug. 21, 1975

[30] Foreign Application Priority Data

Aug. 21, 1974 United Kingdom .............. 36725/74

[51] Int. Cl.² .............................................. G01B 7/34
[52] U.S. Cl. ................................. 33/174 Q; 33/174 L
[58] Field of Search ............ 33/174 Q, 174 L, 178 E, 33/172 E, 147 L, 143 L, 169 R, 172 R, 168 R, 174 P, 174 R

[56] References Cited

U.S. PATENT DOCUMENTS

| 3,110,112 | 11/1963 | Dalgleish ...................... 33/174 L |
| 3,499,227 | 3/1970 | Krause et al. .................. 33/174 P |
| 3,581,402 | 6/1971 | London et al. ................. 33/147 L |
| 3,826,011 | 7/1974 | D'Aniello ....................... 33/174 Q |

FOREIGN PATENT DOCUMENTS 388,228   6/1965   Switzerland ........................ 33/174 L

*Primary Examiner*—Richard E. Aegerter
*Assistant Examiner*—W. Little
*Attorney, Agent, or Firm*—Brisebois & Kruger

[57] ABSTRACT

A roundness measuring instrument of the type having a workpiece table and a pick-up carried on a pick-up mount which is radially adjustable to move the pick-up radially with respect to a fixed axis about which the table is rotatable, in which there is provided a displacement transducer sensitive to the movement of the pick-up mount in the radial direction. A device for summing the signals from the displacement transducer and from the pick-up is used to provide a wide range signal usable in metrological determinations on workpieces, such as determinations of radius and separation of two plane faces. A computer for calculating the value of a predetermined algorithm may also be provided to obviate the necessity for centering either a reference body or the workpiece with respect to the axis of rotation of the table.

4 Claims, 12 Drawing Figures

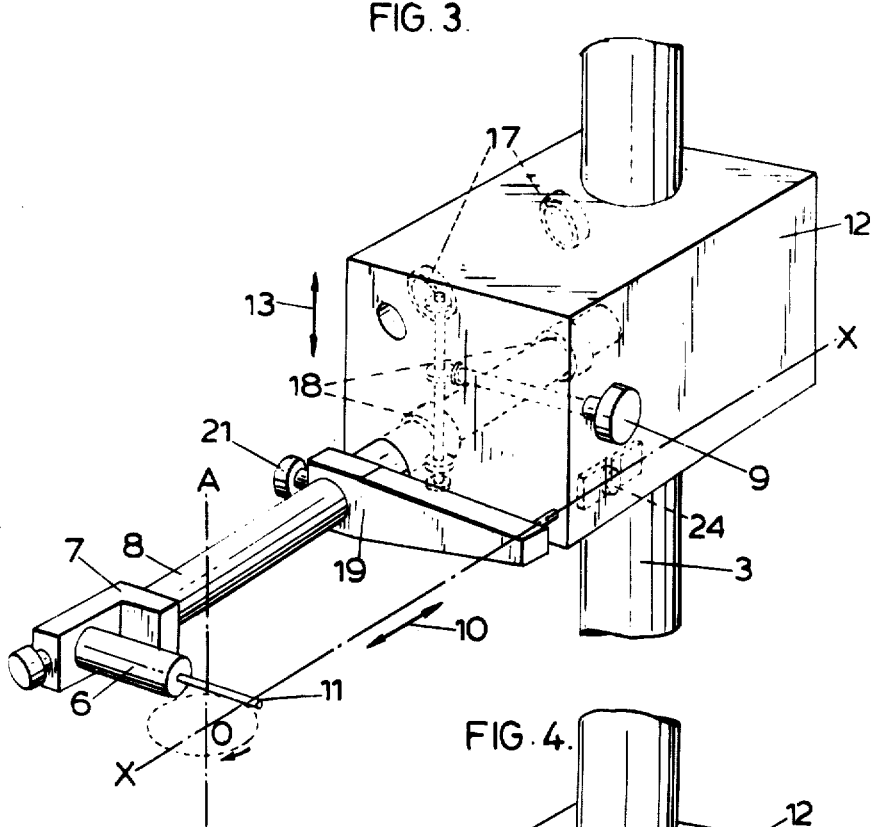
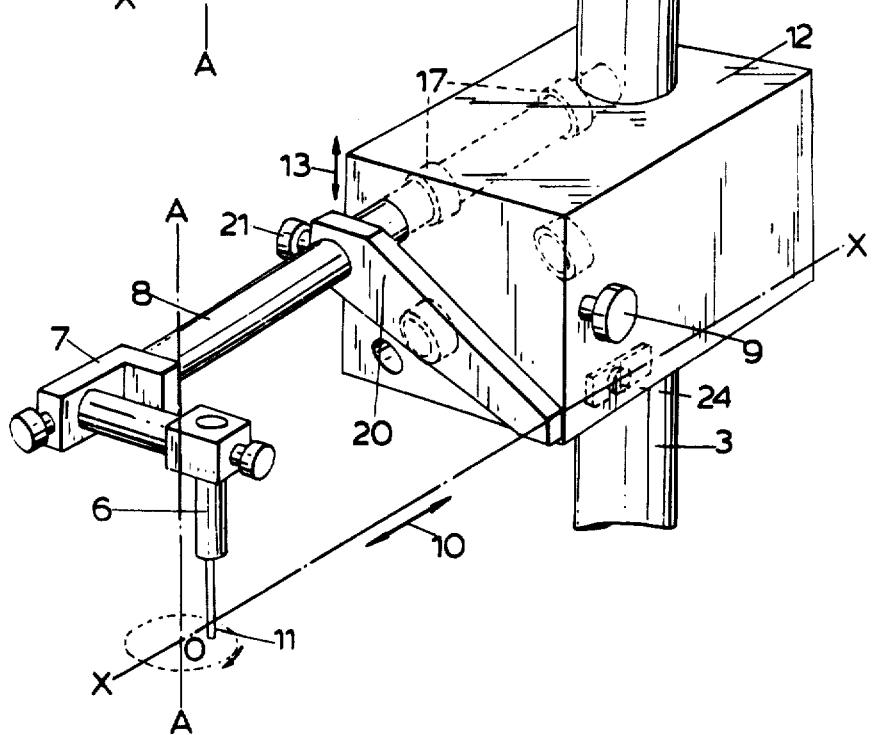

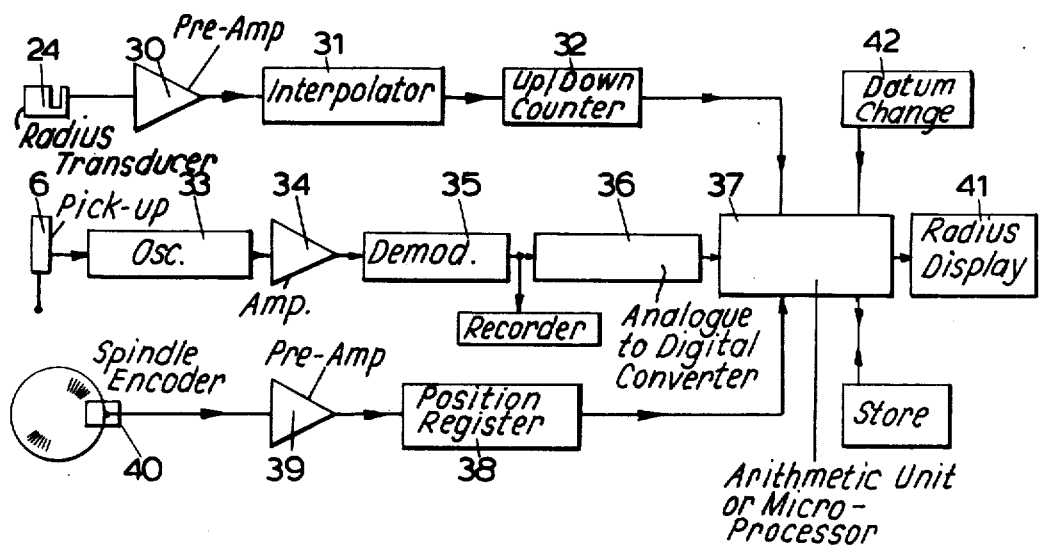
FIG. 7.
FIG. 8a.
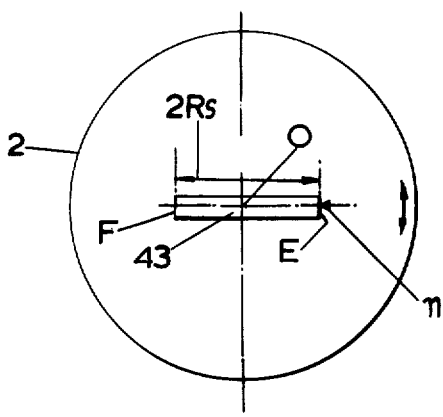
FIG. 8c.
FIG. 8b.
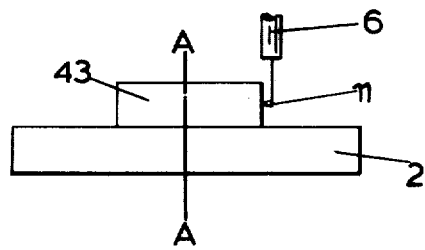
FIG. 8d.
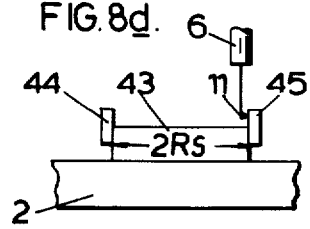

MEASURING APPARATUS

The present invention relates to roundness measurement instruments, and particularly to an instrument having equipment for measuring the radius of a component under test, and to a method of determining the radius of a component under test.

Roundness measuring instruments usually comprise a workpiece table onto which a component under test can be clamped or otherwise fixedly mounted, and which can be adjusted in two perpendicular directions in the plane of the table with respect to a bed of the instrument, and a pick-up carried by a pick-up mount for relative rotation with respect to the workpiece table. Instruments of this type will be referred to herein as instruments of the type described. The pick-up mount may be attached to the spindle by a radially extending arm so that it can be traversed around the component under test while this is relatively fixed with respect to the bed of the instrument, or alternatively the table can be turned while the pick-up mount is maintained in a fixed position with respect to the instrument bed. In an alternative instrument the pick-up mount is separate from the workpiece supporting table and comprises an upright column the axis of which is accurately parallel to the axis of rotation of the workpiece supporting table, and carries an arm which extends transverse the column, is slidable axially of the column, and movable longitudinally of its own axis to carry the pick-up towards or away from the workpiece table.

In operation of such an instrument a workpiece having a circular surface to be assessed is mounted on the workpiece supporting table and rigidly attached thereto. The table is then adjusted about the above-mentioned two perpendicular directions in the plane of the table, which are accurately perpendicular to the axis of rotation of the table, to bring the centre of curvature of the curved surface of the workpiece as near as possible to the axis of rotation of the table. The pick-up is then adjusted in position by moving the radial arm on the supporting column until a stylus of the pick-up engages the surface of the component under test at a suitable part of its range of travel to permit subsequent displacement in either radial direction during a traverse around the surface of the workpiece upon rotation of the workpiece supporting table about its axis.

It will be appreciated that the axis of rotation of the workpiece supporting table forms the axis of relative rotation between the workpiece and the sensor, and it is for this reason that the table must be adjusted so that the centre of the workpiece coincides as accurately as possible with the axis of rotation of the table so that excursions of the stylus of the pick-up can be limited, as far as possible, to movements due to the variations in form and surface texture of the component under test and not due to the eccentricity of mounting of the component under test with respect to the axis of relative rotation between the component and the pick-up.

Because the pick-up is required to have a high resolution the range of movement over which it produces accurate signals is severely limited and the signals produced by the pick-up in fact represent only departures of the surface of the component under test from a reference line, which normally represents the nominal form of the component under test. Amplification and display of the pick-up signals thus effectively suppresses the true radius of the component under test, even when the transducer signals are displayed on a circular chart. This is necessary since the information of interest is usually the very small variations of the surface from the nominal form, which variations are several orders of magnitude smaller than the true radius of the component.

In some applications it is necessary to determine the true radius of a component in addition to determining the surface variations, for example to establish what degree of subsequent machining is possible to correct for any errors of form or surface texture without exceeding any manufacturing tolerances to which a component must conform. The present invention seeks to provide apparatus and a method for determining, with the known types of roundness measuring instruments, the true radius of a component under test as accurately as possible and in a simple manner.

According to one aspect of the present invention there is provided a method of determining the radius of curvature of the curved surface of a component under test using an instrument of the type described, in which at least two signals are obtained and stored representing the radial separation of the surface of a reference body from the axis of relative rotation, at at least two points spaced diametrically opposite one another across the said axis of relative rotation, a plurality of output signals are obtained and stored representing the separation of the surface of the component under test from the said axis of relative rotation, and the said signals are used, together with the known dimensions of the reference body, to provide an output signal representative of the mean radius of curvature of the curved surface of the component under test by computing the value of the expression $$R_c = R_s + (L_c - L_s) + (\bar{R}_c - \bar{R}_s)/M$$

where the symbols are as indicated below.

It will be noted that this method does not require that the reference body or the component under test should be accurately centred with respect to the axis of relative rotation of the sensor and the component and also permits the use of reference bodies which do not themselves have perfectly circular surfaces. For example, the method of the invention may be performed utilising a rectangular gauge block as the reference body, the gauge block having two parallel oppositely directed faces separated by a known distance. Such gauge blocks are well known in the art and are both cheaper to manufacture and of greater versatility than reference bodies having circular surfaces since they can be "wrung" together due to the accuracy of the flatness of their gauging surfaces, to provide different reference dimensions. If such gauge blocks are used either singly or in a "wrung" combination to provide the reference body, it is necessary to determine the said two diametrically opposed points at which the output of the sensor is recorded by traversing the pick-up back and forth across each gauging surface to establish a point on each at which the radial distance from the centre of relative rotation is a minimum, this being indicated by a turning point in the pick-up output.

To determine the internal radius of a hollow body it is normally necessary to adjust the pick-up mount so that the pick-up extends into the hollow body and is carried on a bracket which projects transversely from an arm of the pick-up mount. In this configuration it is necessary for the reference body to have facing reference surfaces and this can be provided from a plurality of gauge blocks by wringing two further gauge blocks to the two oppositely directed faces of the gauge block or gauge combination, which provide the required reference separation, in such a way that a part of the wrung face of each further gauge block overlaps the edge of the co-operating face of the said reference body. The transducer is then traversed across the overlapping part of the said wrung faces of the further gauge blocks to provide the necessary reference signals. The signals so produced will, of course, be substantially the same as would be obtained by traversing the faces of the gauge block or gauge block combination without the further gauge blocks but the position of the stylus of the pick-up would be different since this would have to be turned through 180° in order then to traverse the internal surface of a hollow component and this would introduce mechanical errors.

According to another aspect of the present invention, there is provided a method of determining the radius of curvature of the curved surface of a component under test using a roundness measurement instrument of the type described, comprising the steps of locating a reference body having a circular or part-circular surface on the table, adjusting the table to position the centre of curvature of the curved surface of the reference body substantially coincident with the axis of relative rotation, adjusting the pick-up mount to position a stylus thereof in contact with the surface of the reference body, recording the output signal from the instrument, substituting the component under test for the reference body on the workpiece table, adjusting the table to position the centre of curvature of the curved surface of the component substantially coincident with the axis of relative rotation, adjusting the pick-up mount to position the stylus in contact with the surface of the component under test, recording the output signal from the instrument, and determining the radius of the component from the known radius of the reference body and the difference between the two recorded output signals from the instrument.

Preferably the output signal from the transducer is fed to an adjustable display device which is adjusted to display the radius of the reference body after this has been centred on the table and the pick-up moved into contact therewith, the display device then directly displaying the radius of the component under test when this has been centred on the table and the pick-up moved into contact therwith.

The transducer signals may be processed in analogue form, or alternatively modified to provide a digital readout.

The present invention also comprehends a roundness measuring instrument of the type comprising a workpiece supporting table and a pick-up carried on a pick-up mount, the arrangement being such that the table and the pick-up are relatively rotatable about a fixed axis, in which the pick-up mount is radially adjustable to move the pick-up radially with respect to the said fixed axis, and there is provided a displacement transducer sensitive to the movement of the said pick-up mount in the radial direction with respect to the said fixed axis, at least over a limited range, and operative to produce an output signal representative of radial displacements of the pick-up.

In a preferred embodiment the pick-up mount comprises a column fixedly mounted with respect to the said fixed axis, and a support arm carried at one end by the column and carrying at the other end a bracket for supporting the said pick-up, the arm being movable longitudinally of its axis to adjust the position of the pick-up and the said displacement transducer being mounted between the arm and the column to detect movement of the arm in the direction of its axis with respect to the column. In this latter case it is preferred that the said displacement transducer is supported by the said column and has an actuator arm which is relatively movable with respect to a body of the transducer and movement of which is sensed by the transducer, in operation, to provide output signals representative thereof, the actuator arm being engageable by a fixed abutment stop carried by the support arm of the pick-up mount.

Advantageously, the actuator arm of the transducer and the abutment stop of the support arm are linked magnetically so that movement of the abutment stop in either direction upon longitudinal movement of the support arm causes corresponding movement in either direction of the actuator arm of the transducer.

The displacement transducer may be of any suitable form. For example, it may be a linear grating transducer, or a transducer of the capacitive or inductive type.

Embodiments of the present invention will now be more particularly described, by way of example, with reference to the accompanying drawings, in which:

FIG. 3 is a perspective view of a part of a first embodiment of the invention, employing a capacitive linear displacement transducer;

FIG. 4 is a perspective view of a part of a second embodiment of the invention, employing an inductive linear displacement transducer;

FIG. 7 is a block schematic diagram illustrating a further embodiment of the invention; and FIGS. 8a to 8d are schematic diagrams further illustrating a method according to the invention.

Figure 1:
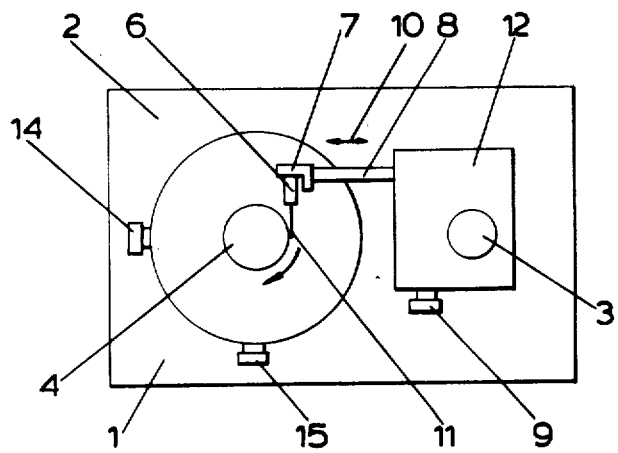
FIG. 1 is a plan view of a typical roundness measurement instrument of the type described.
Figure 2:
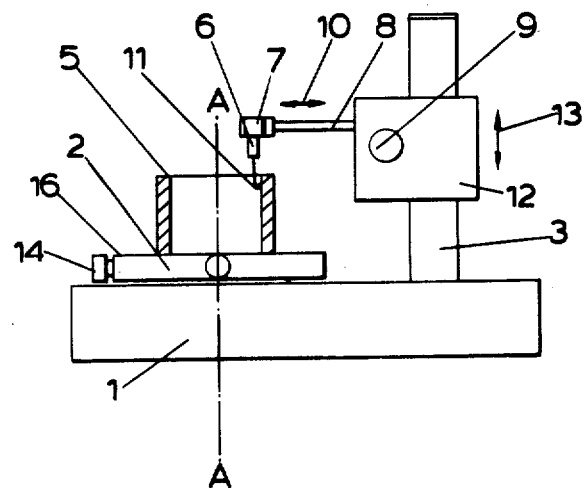
FIG. 2 is a schematic side view of the instrument shown in FIG. 1.

Referring now to the drawings FIGS. 1 and 2 illustrate a known type of roundness measuring instrument of the type described which comprises a bed 1 on which is rotatably mounted a workpiece carrying table 2 which is shown in FIG. 1 carrying a solid cylindrical workpiece 4, and in FIG. 2 carrying a hollow cylindrical workpiece 5.

Also mounted on the bed 1 is an upright support column 3 along which is slidable a carriage 12 from which projects a pick-up support arm 8 on the outer end of which there is a bracket 7 carrying a pick-up 6. The bracket 7 is movable to one of two orientations, that is the orientation shown in FIG. 1 in which a stylus 11 of the pick-up 6 projects substantially horizontally for engagement with a workpiece such as the workpiece 4 shown on the workpiece table 2 in FIG. 1, or to the orientation, shown in FIG. 2, where the stylus 11 is substantially vertical for engagement with the inner curved surface of a hollow cylindrical component 5 such as that shown on the workpiece table 2 in FIG. 2. A control knob 9 on the carriage 12 provides adjustment of the pick-up arm 8 longitudinally of its axis to move the stylus 11 of the pick-up 6 radially towards or away from the surface of the workpiece carried by the table 2.

The workpiece carrying table 2 is mounted for rotation about a fixed datum axis indicated A—A in FIG. 2, and includes an upper platten 16 which is substantially flat and which is adjustable in its own plane in two orthogonal directions by means of adjusting knobs 14, 15, in order to effect centring of the workpiece with respect to the datum axis A—A, that is to adjust the position of the workpiece so that its nominal centre coincides, as closely as possible, with the datum axis A—A.

Referring now to FIG. 3 which illustrates a first embodiment of the invention the carriage 12 is provided with a capacitive linear displacement transducer 24 having a plunger or anvil 23 and the longitudinally adjustable pick-up arm 8 is provided with an adjustable abutment stop 19 which can be moved longitudinally of the pick-up arm 8 and clamped at any desired position therealong by means of a clamping screw 21. The pick-up arm 8 is mounted in bearings 18 and linked to the adjusting knob 9 by means of a gearing system shown in broken outline so that upon rotation of the knob 9 the pick-up arm 8 can be moved, in the direction of the double arrow 10 of FIG. 3, either to advance or to withdraw the pick-up 6 to bring the stylus 11 into contact with the surface of a workpiece, or to withdraw it away from such contact. In the embodiment of FIG. 3, it will be noted that the bracket 7 holding the pick-up 6 is so adjusted that the stylus 11 extends substantially horizontally for engagement with the outer curved surface of a workpiece.

Figure 5:
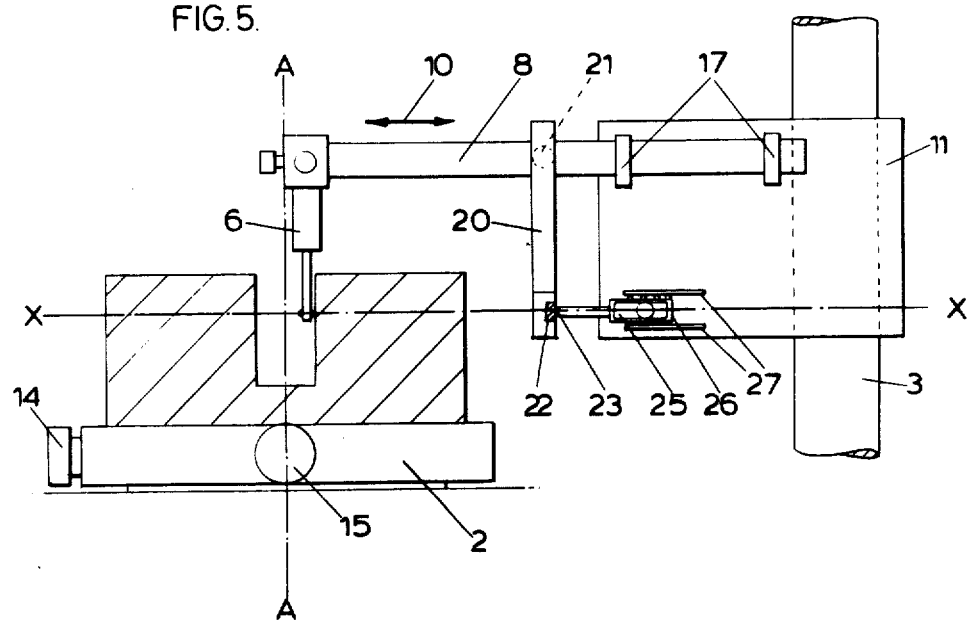
FIG. 5 is a schematic side view of a further embodiment of the invention employing a linear grating displacement transducer.

In the embodiment of FIG. 4 the bracket 7 on the end of the pick-up arm 8 is adapted so that the stylus 11 projects parallel to the support column 3 so as to be in a suitable position for engagement with the internal curved surface of a hollow workpiece such as that shown in position on the workpiece carrying table 2 in FIG. 5. In this second embodiment the pick-up arm 8 is carried on alternative bearings 17 in the carriage 12 and is correspondingly linked to the radial adjustment knob 9. Slidably mounted for movement along the pick-up arm 8 is an abutment stop 20 which is shaped differently from the abutment stop 19 of the embodiment of FIG. 3 in order to bring it into engagement with the plunger or anvil 23 of a linear displacement inductive transducer 24 mounted in the same position in the carriage 12 as in the embodiment of FIG. 3. The transducer 24 in the embodiments of both FIGS. 3 and 4 is positioned to be coincident with a radial line X—X which intersects the datum axis A—A and on which lies the point of contact between the stylus 11 and the workpiece surface. This construction ensures that the accuracy of measurement of the displacement transducer 24 is, to a first order, independent of errors in translation of the pick-up.

In the embodiment shown in FIG. 5, the moving parts of the transducer 24 are mounted on roller bearing slides 27 so as to be as freely movable as possible. In the embodiment shown in FIG. 5 the transducer is a linear grating transducer having a linear grating 25 mounted directly onto a frame 26 which runs between the two linear roller bearing slides 27.

Contact between the abutment stop 19 in the embodiment of FIG. 3, or 20 in the embodiment of FIG. 4, with the anvil 23 of the transducer 24 is, in each case, ensured by a magnet 22 (FIG. 5) which interacts with the anvil 23 directly, if this is of ferromagnetic material, or with a ferromagnetic element carried by the anvil 23. The magnetic link between the abutment stop 19, 20 and the anvil 23 of the transducer 24 ensures that no external forces other than the displacement forces in the required direction are transmitted to the transducer 24 and also ensures that the connection between the abutment stop and the transducer can be readily disengaged to convert one embodiment to another by withdrawing the pick-up arm 8 from one set of bearings and replacing it in another, substituting one abutment stop for the other at the same time. The embodiments of the invention also include means (not shown in FIGS. 3 to 5) for adjusting the display of the transducer 24 to any desired reading. A simple method of using the instrument described above is as follows:

A circular reference body such as a ring gauge or other known standard cylindrical body is placed on the work table 2 and the abutment stop 20 is adjusted to move the transducer 24 approximately to a mid-range position and the clamping screw 21 tightened to lock the abutment firmly with respect to the pick-up arm 8. Then adjustments are made by means of the knobs 14, 15 to effect centring of the reference body with respect to the axis A—A, adjustments to the radial distance of the transducer 6 being made by means of the knob 9 as necessary. The display from the transducer 24 is then adjusted so that this corresponds to the known radius of the reference body and the reference body is then removed from the work table and the component under test, the radius of which is to be determined, is positioned on the work table in its place. The work table 2 is adjusted, again by means of the knobs 14, 15 to centre the component under test with respect to the axis A—A, and the stylus 11 of the transducer 6 is moved into engagement with the surface of the component. The display of the transducer 24 will then provide a reading showing the radius of the component under test. In the preferred embodiment with the transducer 24 being a linear grating transducer the quadrature signals obtained from the transducer photo-head may be fed to an incremental up/down counter and digital display with datum change facility in order to provide the required readout. The associated electronics and hardware for these devices are well known in the art and will not be described in any further detail below. The radial position measured will be dependent upon a subjective assessment of both the centre of the body and a representative point on the surface if the body is not of perfectly accurate form and this represents the greatest degree of inaccuracy of the instrument.

An alternative method of using the instrument, which does not rely on a subjective assessment of the form of the component under test, but which requires further electronic processing apparatus, is described below. To illustrate this method, reference is made to FIG. 6a and FIG. 6b which illustrate a circular chart display of a pick-up signal representing, in the case of FIG. 6a a circular component, and in the case of FIG. 6b a part-circular component. In each case the centre of the chart is indicated $C_1$ and the inner radius indicated $S_1$ which corresponds to the suppressed radius L of the component. The true radius of the component is R, and can be calculated from the expression:

$$R = L + \overline{R}/\overline{M} \tag{1}$$

where $\overline{R}$ represents the radius of a unique best fit curve, known as the "least squares circle" which is derived from the pick-up signals represented by $r(\theta)$, that is the value of the pick-up signal at an angular position $\theta$, with respect to a fixed datum position, and $M$ is the instrument magnification.

Figure 6A:
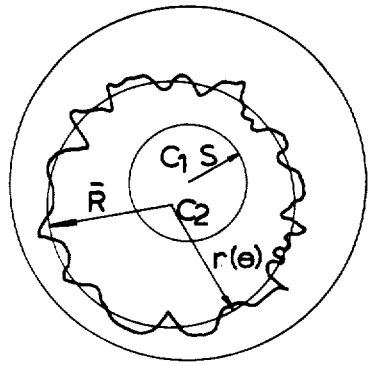
FIGS. 6a and 6d are schematic diagrams illustrating the performance of the method of the invention.
Figure 6B:
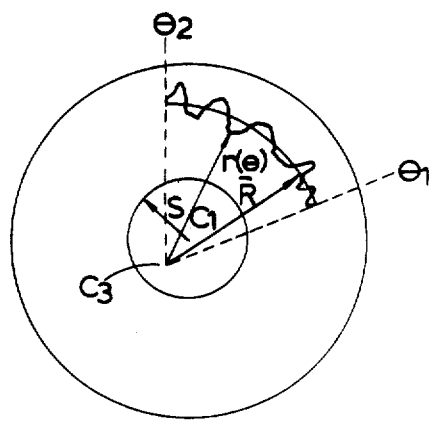

For a circular component as shown in FIG. 6a, $$R = \frac{1}{2}\pi \int_0^{2\pi} r d\theta$$

and for an arcuate component as shown in FIG. 6b, $$R = \frac{1}{\theta_2 - \theta_1} \int_{\theta_1}^{\theta_2} r d\theta - \frac{\bar{x}}{\theta_2 - \theta_1} \int_{\theta_1}^{\theta_2} \cos\theta d\theta - \frac{\bar{y}}{\theta_2 - \theta_1} \int_{\theta_1}^{\theta_2} \sin\theta d\theta \quad (3)$$

where $\bar{x}, \bar{y}$ are calculable functions of $f(\theta)$, $\theta_1$ and $\theta_2$.

Alternatively, if the limits of integration are symmetrical about the centre of the arc, $$R = \frac{1}{2\theta_3} \left( \int_{-\theta_3}^{\theta_3} r d\theta - 2x \sin \theta_3 \right) \quad (4)$$

where $$\theta = \tfrac{1}{2}(\theta_2 - \theta_1) \quad (5)$$

In order to calculate the value of the parameter $\overline{R}$ it is necessary to provide an absolute angular reference of the relative position of the component and the pick-up. With such a reference, it is then merely necessary, in order to determine a radius of a component under test, first to locate a reference body on the work table 2 and, using the controls 14, 15 to ensure that the whole of the trace from the pick-up 6 of the surface of the test body is within the range of movement of pick-up 6, adjusting the abutment stop 19, 20 to move the transducer 24 to a mid-range position. The value of $\overline{R}$ for the reference body can then be determined from a traverse around its surface and, following substitution of the component under test for the reference body, and approximate centring of this to ensure that the stylus 6 remains within its working range of movement during a whole traverse, the value $\overline{R}$ for the component is determined from a traverse of the stylus around the surface of the component. Then, using the subscript $s$ for the reference body and $c$ for the component, it will be seen that since:

$$R_s = L_s + \overline{R}_s/M \quad (6)$$

and for the component $$R_c = L_c + \overline{R}_c/M \quad (7)$$

thus:

$$R_c = R_s + (L_c - L_s) + \frac{(\overline{R}_c - \overline{R}_s)}{M} \quad (8)$$

From this equation $R_c$ can be calculated since $R_s$ represents the known radius of the reference body, $(L_c - L_s)$ is the change in output of the transducer 24 between the reference body and the component under test, $\overline{R}_c$ and $\overline{R}_s$ are determined from the traverse of the stylus 11 and $M$ is known. Precise centring of the reference body and the component is thus not necessary.

FIG. 7 illustrates, in schematic block diagram form, the apparatus required for the performance of the method described above. In this apparatus the transducer 24 feeds its output to a pre-amplifier 30 the output of which is fed to an interpolator 31 and from there to a counter 32 which counts up when receiving pulses from the radius transducer moving in a first direction, and down when receiving pulses from the radius transducer 24 moving in the opposite direction. The pick-up 6 feeds signals to an oscillator 33 the output of which is fed to an amplifier 34 and then via a demodulator 35 to an analogue-to-digital converter 36, from there being fed to a computing unit 37 which is fed with the output signals from the counter 32 and also with signals from a position register 38 which is fed from an amplifier 39 with signals from an encoder 40 or angular transducer which provides signals representative of the relative angular position of the work table 2 and the pick-up 6. The computing unit operates, in a known manner, to produce output signals in accordance with the equations set out above to produce a display signal representative of the radius of the component under test, which signal is displayed in a display device 41. A datum change control circuit 42 provides the necessary input signals to set the display to the reference value and to scale the output display signal by the appropriate units.

A further simplification which is possible, involves the use of a gauge block in place of the circular reference body. If a gauge block is utilised the instrument can be set up in a simpler manner. FIG. 8 illustrates the steps in the process of this alternative method.

Referring now to FIG. 8 there is shown, in FIG. 8a, a workpiece table 2 carrying a rectangular gauge block 43 with a pick-up stylus 11 in contact with the face E thereof. The pick-up signal from the stylus 11 is displayed on a chart and the table 2 rotated through a small angle on either side of the position shown in FIG. 8a to establish a point where, as shown in FIG. 8 the pick-up signal is a minimum, thereby indicating that the axis of the gauge block is parallel to the radial line X—X (FIG. 3). The magnification of the instrument is set to a value which provides a suitable resolution for the turning point and, with the instrument set at the turning point with the workpiece table fixed the magnification of the instrument is set to that at which radius measurement is normally performed and the transducer and pick-up signals recorded. The procedure is then repeated at the opposite gauge block face and then the component under test substituted for the gauge block and a traverse of its surface is effected with the readings of the transducer 24 and pick-up 6 being recorded at intervals around the traverse. Suitably, one hundred ordinates, that is recordings of the pick-up outputs may be made during a whole circular traverse, although these may be required at a more narrow angular separation if a part-circular component is under test.

It is possible to detect the turning point of the pick-up signal electronically by rapidly sampling the digitally converted signal as the table is rotated through the turning point and comparing successive values of the signal with previous values. As soon as the signal changes sign this point can be noted and stored. This method has further advantage in that it can be carried out at the same magnification as is used for the measurement of the radius since sufficient resolution is provided by the analogue to digital converter at this magnification.

If the radial separation of the first face E of the gauge block from the centre O of relative rotation of the table and pick-up at the point at which the pick-up output is recorded is $R_1$, and $x_1$ is the output level of the pick-up then:

$$R_1 = L_1 + x_1/M \tag{9}$$

Similarly, with a corresponding notation, for the opposite face F $$R_2 = L_2 + x_2/M, \text{ thus: } R_1 + R_2 = L_1 + L_2 + x_1 + x_2/M \tag{10}$$

and therefore $$R_s = L_1 + L_2/ + x_1 + x_2/2M$$

where $L_1 + L_2/2$ corresponds to the suppressed radius Ls of the reference body and $x_1 + x_2/2$ corresponds to the parameter $\bar{R}s$ in the previously used expression for Rs (equation 6). Since Rs is known from the calibrated value of the gauge block (equal to half the gauge block length) and Rs can be computed, these can be used in equation (8) to determine the mean radius Rc of the component. A similar method can be used to determine the radial separation of two points on a workpiece surface, for example two flat parallel oppositely directed faces of a workpiece. In this case calibration is effected as before but instead of a traverse of the workpiece merely two readings are taken, one on each surface, detecting positions at which the signals reach a minimum value as with the calibration. The means "radius" Rc calculated from this data then represents half the separation of the two surfaces.

FIG. 8d illustrates a gauge block combination for use in determining the radius of a hollow body. As will be seen the gauge block 43 has two further gauge blocks 44, 45 wrung to the gauge faces thereof with a degree of overlap on the engaging faces to permit the stylus 11 to engage these faces when in the orientation shown in FIG. 4 suitable for engagement with the inner curved face of a hollow component.

This method thus avoids the necessity for subjective assessment of the component by the instrument operator, and the use of a gauge block or wrung up combination of gauge blocks makes it unnecessary to have a range of cylindrical reference bodies or ring gauges to determine the radius of a range of different size components. The only restriction on the size of the gauge blocks, with respect to the nominal size of the diameter of the components is that the difference between them should be less than twice the working range of the transducer 24 so that this transducer is not moved out of its working range when transferring from the standard to the component to be measured.

I claim:

1. A method of determining the radius of curvature of the curved surface of a component under test using a roundness measuring instrument of the type comprising:
a workpiece table,
a pick-up,
amplifier means connected to said pick-up,
a pick-up mount supporting said pick-up, and
means interconnecting said pick-up mount and said workpiece support table such that said pick-up and said table are relatively rotatable about a main axis of the instrument and said pick-up is adjustable radially towards or away from said main axis so as to be brought into contact with a workpiece on said workpiece support table to produce output signals representative of the surface of said workpiece,
a displacement transducer having a body connected to one of said pick-up mount and a fixed frame member which is fixed with respect to said main axis, and a sensing element movable with respect to said body and attached to the other of said fixed frame member and said pick-up mount, and
means connected to the output of said pick-up amplifier means and to the output of said displacement transducer and operating to produce an instrument output signal representing the sum of the signals from said pick-up and said displacement transducer,
whereby to provide output signals representing the radial displacement of said pick-up over a limited range,
said method comprising the steps of:
locating a reference body on the table of said instrument,
obtaining at least two instrument output signals representing the radial separation of the surface of said reference body from the axis of relative rotation at at least two points spaced diametrically opposite one another across the said axis of relative rotation, and storing said two instrument output signals,
substituting a component under test for said reference body,
obtaining a plurality of instrument output signals representing the separation of the surface of the component under test from said axis of relative rotation, and
providing from said instrument output signals and the known dimensions of the reference body, an output signal representative of the mean radius of curvature of the curved surface of the component under test by computing the value of the expression $$R_c = R_s + (L_c - L_s) + (\bar{R}_c - \bar{R}_s)/M$$

where:
$R_c$ is the mean radius of the component under test
$R_s$ is the mean radial separation of the surface of the reference body from the instrument at the two points detected
$(L_c - L_s)$ is the change in the instrument output signal upon substitution of the component for the reference body
$\bar{R}_c$ is the radius of the least squares reference circle computed from the pick-up output signal upon traversing the component
$\bar{R}_s$ is the radius of the least squares reference circle computed from the values of the pick-up output signal at the said two diametrically opposite points on the reference body
and $M$ is the magnification of the instrument.

2. The method of claim 1, wherein said reference body is a gauge block having two substantially parallel flat oppositely directed reference surfaces and the two transducer signals representing the radial separation of the surface of the reference body from the centre of relative rotation are obtained by traversing the transducer across each flat reference surface in turn and establishing for each a point at which the signal representing the radial distance of the surface from the centre of relative rotation is a minimum.

3. The method of claim 2, for determining the internal radius of a hollow body further comprising the steps of wringing two further gauge blocks to said two oppositely directed reference surfaces in such a way that a part of the wrung face of each said further gauge block overlaps the edge of the cooperating face of said reference body, and traversing said sensor across said wrung faces of said further gauge blocks.

4. A method of determining the separation between two surfaces of a workpiece using a roundness measuring instrument of the type comprising:

a workpiece table,
a pick-up,
amplifier means connected to said pick-up,
a pick-up mount supporting said pick-up, and
means interconnecting said pick-up mount and said workpiece support table such that said pick-up and said table are relatively rotatable about a main axis of the instrument and said pick-up is adjustable radially towards or away from said main axis so as to be brought into contact with a workpiece on said workpiece support table to produce output signals representative of the surface of said workpiece,
a displacement transducer having a body connected to one of said pick-up mounts and a fixed frame member which is fixed with respect to said main axis, and a sensing element movable with respect to said body and attached to the other of said fixed frame member and said pick-up mount, and
means connected to the output of said pick-up amplifier means and to the output of said displacement transducer and operating to produce an instrument output signal representing the sum of the signals from said pick-up and said displacement transducer,
whereby to provide output signals representing the radial displacement of said pick-up over a limited range, said method comprising the steps of:
mounting a reference body on the table,
obtaining at least two instrument output signals representing the radial separation of the surface of the reference body from the axis of relative rotation at at least two points spaced diametrically opposite one another across said axis of relative rotation, storing said signals,
substituting the workpiece under test for the reference body and obtaining two instrument output signals representing the radial separation of each of said two workpiece surfaces from said axis of relative rotation at two points and,
computing from said signals and the known dimensions of the said reference body the value of the diameter of a circle including as diametral points the said two points on the said two workpiece surfaces from the expression $$R_c = R_s + (L_c - L_s) + (\overline{R}_c - \overline{R}_s)/M$$

where:
$R_c$ is the mean radius of the component under test
$R_s$ is the mean radial separation of the surface of the reference body from the instrument at the two points detected
$(L_c - L_s)$ is the change in the instrument output signal upon substitution of the component for the reference body
$R_c$ is the radius of the least squares reference circle computed from the pick-up output signal upon traversing the component
$\overline{R}_s$ is the radius of the least squares reference circle computed from the values of the pick-up output signal at the said two diametrically opposite points on the reference body
and $M$ is the magnification of the instrument.

* * * * *